United States Patent
Higashimachi et al.

(10) Patent No.: US 11,760,274 B2
(45) Date of Patent: Sep. 19, 2023

(54) VEHICULAR SENSOR MOUNTING STRUCTURE

(71) Applicant: TOYOTA JIDOSHA KABUSHIKI KAISHA, Aichi-ken (JP)

(72) Inventors: Naoya Higashimachi, Toyota (JP); Taro Hasegawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 146 days.

(21) Appl. No.: 17/221,841

(22) Filed: Apr. 5, 2021

(65) Prior Publication Data
US 2021/0354636 A1 Nov. 18, 2021

(30) Foreign Application Priority Data
May 12, 2020 (JP) ................................ 2020-083708

(51) Int. Cl.
*B60R 11/00* (2006.01)
*B60R 11/04* (2006.01)
*H04N 7/18* (2006.01)
*B60R 16/02* (2006.01)

(52) U.S. Cl.
CPC .......... *B60R 11/04* (2013.01); *B60R 16/0215* (2013.01); *H04N 7/18* (2013.01); *B60R 2011/004* (2013.01)

(58) Field of Classification Search
CPC ......... B60R 11/04; B60R 11/00; B60R 11/02; B60R 16/0215; B60R 19/483; B60R 2011/004
See application file for complete search history.

(56) References Cited

U.S. PATENT DOCUMENTS

| | | | | |
|---|---|---|---|---|
| 1,945,112 A | * | 1/1934 | Hogan | G03B 15/08 352/132 |
| 3,783,261 A | * | 1/1974 | Hartmann | G03B 15/03 352/198 |
| 4,063,258 A | * | 12/1977 | Allen | G03B 15/035 396/419 |
| 4,420,238 A | * | 12/1983 | Felix | F16M 11/18 348/151 |
| 5,491,464 A | * | 2/1996 | Carter | B60Q 1/2611 348/148 |
| 5,897,223 A | * | 4/1999 | Tritchew | G02B 27/644 348/144 |

(Continued)

FOREIGN PATENT DOCUMENTS

| | | |
|---|---|---|
| JP | 2002-034055 A | 1/2002 |
| JP | 2016150624 A | 8/2016 |
| WO | 2018/074215 A1 | 4/2018 |

*Primary Examiner* — Nkeisha Smith
(74) *Attorney, Agent, or Firm* — HAUPTMAN HAM, LLP

(57) ABSTRACT

A vehicular sensor mounting structure for a sensor that is mounted on a roof of a vehicle to detect an environment outside the vehicle is equipped with a bracket attached to the roof to support the sensor in a swingable manner, and a cover member having a sensor opening portion that opens toward an outer periphery of the vehicle, and provided on the roof in such a manner as to cover the sensor from above. The cover member has a wire harness cover portion covering, from above, a wire harness that passes through the roof from below, that protrudes into the cover member, and that is connected to the sensor.

10 Claims, 9 Drawing Sheets

(56) References Cited

U.S. PATENT DOCUMENTS

| | | | | |
|---|---|---|---|---|
| 5,956,079 | A * | 9/1999 | Ridgley | H04N 7/18 |
| | | | | 348/148 |
| 6,375,369 | B1 * | 4/2002 | Schneider | G08B 13/19619 |
| | | | | 348/143 |
| 6,536,724 | B2 * | 3/2003 | Furuta | F16M 11/123 |
| | | | | 248/583 |
| 6,708,943 | B2 * | 3/2004 | Ursan | F16M 11/10 |
| | | | | 248/187.1 |
| 6,762,790 | B1 * | 7/2004 | Matko | F16M 11/10 |
| | | | | 396/428 |
| 8,585,302 | B2 * | 11/2013 | Totani | B60R 11/04 |
| | | | | 348/148 |
| 8,831,415 | B2 * | 9/2014 | Greenthal | F16M 11/2078 |
| | | | | 396/419 |
| 9,075,290 | B1 * | 7/2015 | Thieman | F16M 13/022 |
| 9,623,795 | B2 * | 4/2017 | Bowe | G09F 21/04 |
| 9,919,748 | B2 * | 3/2018 | Williams | B62D 37/02 |
| 9,973,665 | B2 * | 5/2018 | Saha | F16M 13/02 |
| 10,129,445 | B2 * | 11/2018 | Minikey, Jr. | H04N 5/2257 |
| 10,196,007 | B2 * | 2/2019 | Nickolaou | B60R 11/04 |
| 10,272,850 | B2 * | 4/2019 | Frank | B62D 25/06 |
| 10,272,886 | B2 * | 4/2019 | Baldovino | B60R 11/04 |
| 10,302,744 | B1 * | 5/2019 | Krishnan | B60R 11/04 |
| 10,343,620 | B2 * | 7/2019 | Zajac | G01C 3/08 |
| 10,514,590 | B2 * | 12/2019 | Cammenga | G03B 11/04 |
| 10,597,089 | B2 * | 3/2020 | Ghannam | B62D 65/02 |
| 10,794,735 | B2 * | 10/2020 | Krishnan | G01D 11/26 |
| 10,981,518 | B1 * | 4/2021 | Krishnan | B60Q 1/30 |
| 11,148,609 | B2 * | 10/2021 | Robertson, Jr. | B08B 17/02 |
| 11,203,305 | B2 * | 12/2021 | Li | B60R 11/00 |
| 11,336,808 | B2 * | 5/2022 | Silva | H01Q 1/3275 |
| 11,388,316 | B2 * | 7/2022 | Yamane | B60R 11/04 |
| 11,472,349 | B2 * | 10/2022 | Zajac | B60R 11/04 |
| 2004/0119881 | A1 * | 6/2004 | Matko | B60R 11/04 |
| | | | | 348/375 |
| 2014/0320654 | A1 * | 10/2014 | Dadeppo | H04N 5/2252 |
| | | | | 348/148 |
| 2015/0307026 | A1 * | 10/2015 | Minikey, Jr. | H01Q 1/42 |
| | | | | 348/148 |
| 2016/0236725 | A1 | 8/2016 | Shirai | |
| 2021/0132475 | A1 * | 5/2021 | Sickler | B60R 16/023 |
| 2021/0227104 | A1 * | 7/2021 | Krishnan | G07C 9/00896 |
| 2021/0302541 | A1 * | 9/2021 | Fields | H05K 7/14 |
| 2022/0179294 | A1 * | 6/2022 | Cywinski | F16M 11/041 |
| 2022/0348149 | A1 * | 11/2022 | Huelsen | B60R 11/04 |

* cited by examiner

VEHICULAR SENSOR MOUNTING STRUCTURE

CROSS-REFERENCE TO RELATED APPLICATION

This application claims priority to Japanese Patent Application No. 2020-083708 filed on May 12, 2020, incorporated herein by reference in its entirety.

BACKGROUND

1. Technical Field

The disclosure relates to a vehicular sensor mounting structure.

2. Description of Related Art

Conventionally, Japanese Unexamined Patent Application Publication No. 2016-150624 (JP 2016-150624 A) is known as a technical document concerning a vehicular sensor mounting structure. This publication discloses a vehicular aerodynamic structure that is equipped with a sensor such as a millimeter-wave radar on a roof, and a roof visor provided in front of the sensor to straighten the flow of air when a vehicle runs.

SUMMARY

By the way, the sensor provided on the roof is preferably mounted in a rotatable or swingable manner to adjust the orientation of the sensor. Besides, the performance of the sensor may be influenced when a wire harness for connecting the sensor to a battery or the like of a vehicle is greatly exposed to the outside of the vehicle.

In one aspect of the disclosure, a vehicular sensor mounting structure for a sensor that detects an environment outside a vehicle on a roof of the vehicle has a bracket attached to the roof to support the sensor in a swingable manner, and a cover member having a sensor opening portion that opens toward an outer periphery of the roof, and provided on the roof in such a manner as to cover the sensor from above. The cover member has a wire harness cover portion covering, from above, a wire harness that passes through the roof from below, that protrudes into the cover member, and that is connected to the sensor.

With the vehicular sensor mounting structure according to the aspect of the disclosure, the bracket supports the sensor in a swingable manner, so the orientation of the sensor on the roof can be adjusted. Furthermore, this vehicular sensor mounting structure has the wire harness cover portion that passes through the roof from below, that protrudes into the cover member, and that is connected to the sensor. Therefore, the wire harness can be kept from being exposed to the outside of the vehicle. Thus, this vehicular sensor mounting structure can further restrain the accuracy of the sensor from falling as a result of a damage of the wire harness or the like, than in the case where the wire harness is greatly exposed. Besides, this vehicular sensor mounting structure is favorable from the standpoint of design of the vehicle as well.

In the vehicular sensor mounting structure according to the aspect of the disclosure, the bracket may support the sensor in a swingable manner in a pitching direction of the vehicle and a yawing direction of the vehicle. With this vehicular sensor mounting structure, the sensor is supported in a swingable manner in the pitching direction of the vehicle and the yawing direction of the vehicle. Therefore, the degree of freedom in adjusting the orientation of the sensor can be made higher than in the case where the sensor can swing only in one direction.

In the vehicular sensor mounting structure according to the aspect of the disclosure, the bracket may support the sensor in a swingable manner in a rolling direction of the vehicle and a yawing direction of the vehicle. With this vehicular sensor mounting structure, the sensor is supported in a swingable manner in the rolling direction of the vehicle and the yawing direction of the vehicle. Therefore, the degree of freedom in adjusting the orientation of the sensor can be made higher than in the case where the sensor can swing only in one direction.

In the vehicular sensor mounting structure according to the aspect of the disclosure, the wire harness cover portion may be located on the cover member inside the roof, and is formed such that a height of the wire harness cover portion approaches a height of the roof in a direction away from the sensor opening portion. With this vehicular sensor mounting structure, the wire harness cover portion is formed such that the height thereof approaches the height of the roof in a direction away from the sensor opening portion on the outer periphery side of the roof. Therefore, the occurrence of a swirl constituting a cause of wind noise during the running of the vehicle can be further suppressed than in the case where the wire harness cover portion is a steep step.

In the vehicular sensor mounting structure according to the aspect of the disclosure, the cover member may be formed such that a height of the cover member approaches a height of the roof in a backward direction with respect to the vehicle. With this vehicular sensor mounting structure, the cover member is formed such that the height thereof approaches the height of the roof in the backward direction with respect to the vehicle. Therefore, the occurrence of a swirl constituting a cause of wind noise during the running of the vehicle can be further suppressed than in the case where a rear side of the cover member is a steep step.

With the vehicular sensor mounting structure according to the aspect of the disclosure, the accuracy of the sensor can be restrained from falling as a result of a damage of the wire harness or the like, by keeping the wire harness from being exposed to the outside of the vehicle, while making the orientation of the sensor on the roof adjustable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The embodiments of the present disclosure will be described hereinafter with reference to the drawings. A vehicular sensor mounting structure in the present disclosure is a mounting structure for a sensor mounted on a roof of a vehicle to detect an environment outside the vehicle. The type of the vehicle and the shape of the roof are not limited in particular. The environment outside the vehicle includes, for example, a situation of other vehicles around the vehicle.

First Embodiment

Figure 1:
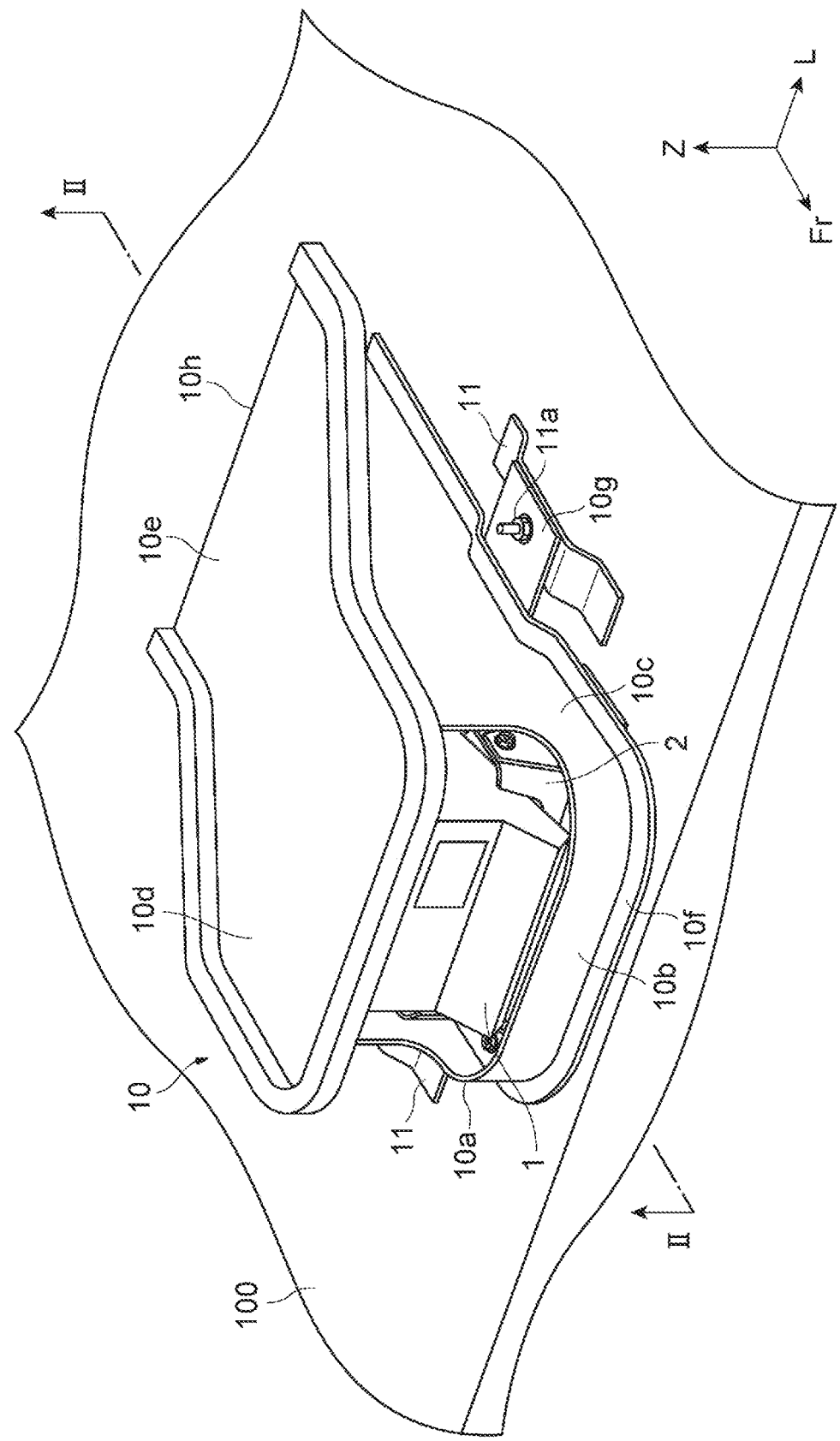
FIG. 1 is a perspective view showing a vehicular sensor mounting structure according to the first embodiment.
Figure 2:
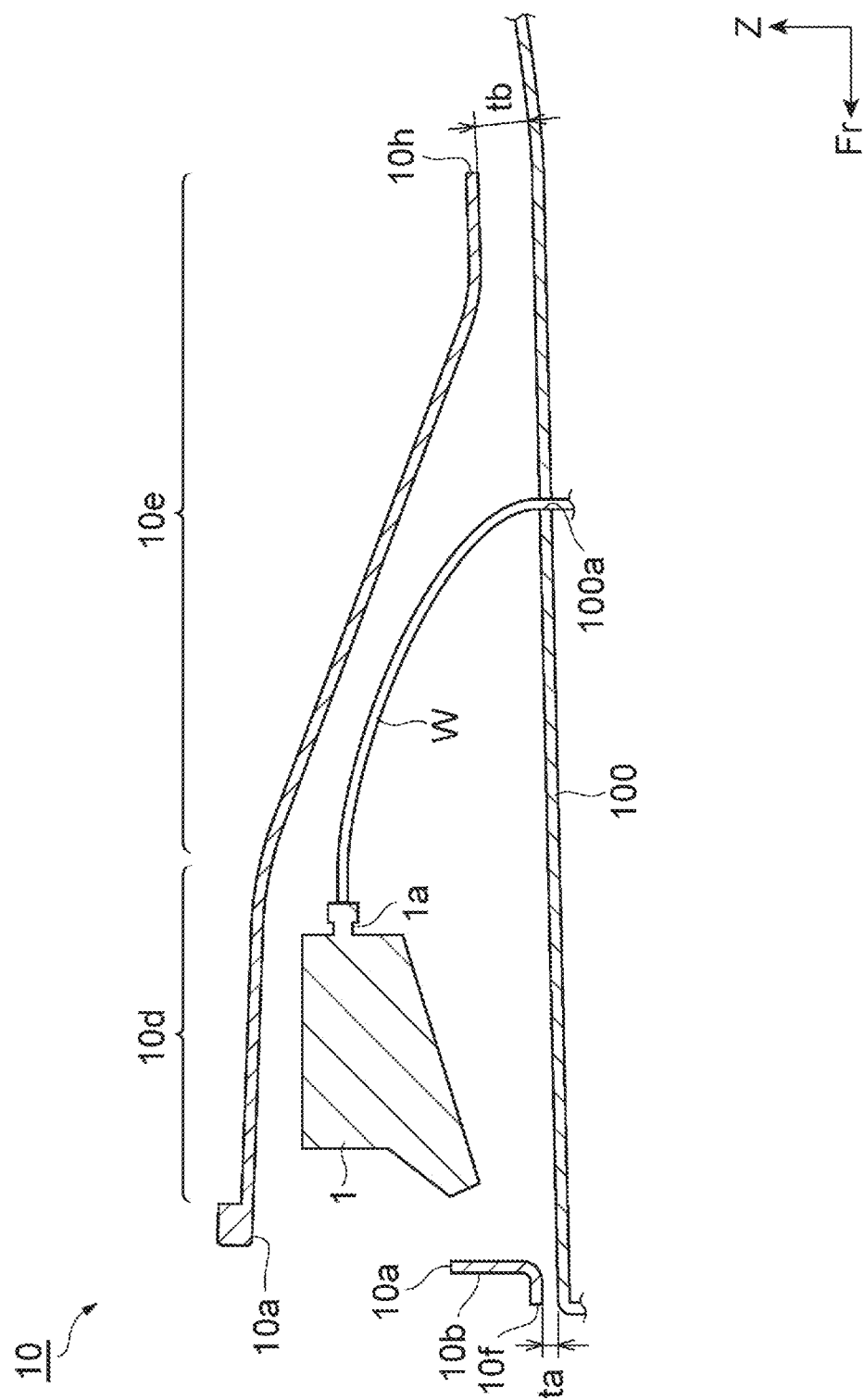
FIG. 2 is an end view along a line II-II of FIG. 1.

FIG. 1 is a perspective view showing a vehicular sensor mounting structure according to the first embodiment. FIG. 2 is an end view along a line II-II of FIG. 1. In each of the drawings, there is shown a three-dimensional orthogonal coordinate system having a forward direction, a leftward direction, and an upward direction with respect to a vehicle denoted by Fr, L, and Z respectively.

In the first embodiment, a sensor mounting structure having a sensor (a camera 1) installed in such a manner as to be directed forward with respect to the vehicle will be described as an example. Incidentally, the vehicular sensor mounting structure may be installed such that the sensor is not directed forward with respect to the vehicle. The vehicular sensor mounting structure may be installed such that the sensor is directed backward or laterally with respect to the vehicle, or may be installed such that the sensor is directed diagonally with respect to the vehicle.

As shown in FIGS. 1 and 2, the vehicular sensor mounting structure according to the first embodiment is equipped with the camera 1, a bracket 2, and a cover member 10. The camera 1 is an exemplary sensor that is mounted on a roof 100 of the vehicle to detect an environment outside the vehicle. In the present embodiment, the camera 1 is mounted in such a manner as to image an area in front of the vehicle.

The type of the camera 1 is not limited in particular. The camera 1 may either be a monocular camera or a stereo camera. Besides, the sensor that detects the environment outside the vehicle may not necessarily be a camera, but may be a millimeter-wave radar, a microwave radar, a lidar (light detection and ranging), an infrared sensor, a sonar sensor, or the like.

The camera 1 is connected to a battery of the vehicle and an electronic control unit (ECU) via a wire harness W (see FIG. 2). The wire harness W is an assembly of parts such as a bundle of a plurality of electric wires used to supply electric power or transmit signals. The camera 1 has, on a back surface thereof, a connection portion 1a to be connected to the wire harness W. The connection portion 1a may not necessarily be located on the back surface of the camera 1. The connection portion 1a may be located on a lower surface, a lateral surface, or an upper surface of the camera 1. The wire harness W passes through a wire passage hole 100a of the roof 100 from below, protrudes into the cover member 10, and is connected to the camera 1.

The bracket 2 is a member that is attached to the roof 100 to support the camera 1 as a sensor in a swingable manner. The bracket 2 is formed of, for example, resin or metal (aluminum or the like). The bracket 2 may be attached to the roof 100 via other members. The configuration of the bracket 2 will be described later.

The cover member 10 is a member provided on the roof 100 in such a manner as to cover the camera 1 from above. The cover member 10 is formed of, for example, resin. The cover member 10 may be formed of the same material as a bumper or the like of the vehicle. The cover member 10 has a sensor opening portion 10a, a front wall portion 10b, lateral wall portions 10c, a sensor cover portion 10d, and a wire harness cover portion 10e.

The sensor opening portion 10a opens forward with respect to the vehicle (toward the outer periphery of the vehicle), and the camera 1 images the area in front of the vehicle through the sensor opening portion 10a. Besides, the sensor opening portion 10a is formed as an opening having such a size as not to impede the imaging of the outside environment even when the orientation of the camera 1 is adjusted.

The front wall portion 10b is a wall portion located on the front side and constituting the cover member 10. The front wall portion 10b is located in front of the camera 1, and forms a lower edge of the sensor opening portion 10a. A lower end of the front wall portion 10b protrudes forward to form a front end edge 10f.

The front end edge 10f is a front-most region of the cover member 10 (see FIG. 2). A lower surface of the front end edge 10f is not in contact with the roof 100, and an air introduction gap ta is formed between the front end edge 10f and the roof 100. The size of the air introduction gap ta is not limited in particular, but may be, for example, 5 mm. The air introduction gap ta may be 7 mm or 10 mm. The air introduction gap ta may be of any size equal to or larger than 5 mm. Air enters the cover member 10 from the air introduction gap ta, when the vehicle runs.

The lateral wall portions 10c are a pair of right and left wall portions constituting the cover member 10. The lateral wall portions 10c form right and left edges of the sensor opening portion 10a respectively. Lower surfaces of the lateral wall portions 10c are not in close contact with the roof 100 either, and a gap is formed between each of the lower surfaces of the lateral wall portions 10c and the roof 100.

Fastening plate portions 10g protruding laterally of the cover member 10 are glued to the lower surfaces of the lateral wall portion 10c respectively. The fastening plate portions 10g are fixed to the roof 100 by being fastened to cover fastening members 11 by bolts 11a respectively. Each of the cover fastening members 11 is formed by bending a metal plate substantially into the shape of a hat in a lateral view. Each of the cover fastening members 11 has a pair of leg portions fixed to the roof 100, and a central platform portion that is raised and supported by the leg portions and through which a bolt hole through which the bolt 11a passes is formed.

The cover member 10 is fixed to the roof 100 by fastening the fastening plate portions 10g and the cover fastening members 11 together. The fastening plate portion 10g and the cover fastening member 11 are provided on the right side of the cover member 10 as well. The cover member 10 is fixed to the roof 100 from the right and left sides. Incidentally, the structure for fixing the cover member 10 is not limited to the aforementioned structure, and a well-known fixation structure can be adopted to fix the cover member 10.

The sensor cover portion 10d is a region that forms a ceiling part of the cover member 10. The sensor cover portion 10d is provided in such a manner as to cover the camera 1 above the camera 1, and forms an upper edge of the sensor opening portion 10a. The sensor cover portion 10d is provided in such a manner as to form a space that is high enough to accommodate the camera 1.

The wire harness cover portion 10e is a region that forms the ceiling part of the cover member 10 together with the sensor cover portion 10d. The wire harness cover portion 10e is provided in such a manner as to cover, from above, the wire harness W connected to the camera 1. The wire harness cover portion 10e forms a space for accommodating the wire harness W, together with the lateral wall portions 10c. The wire harness W is not exposed to the outside of the cover member 10.

The wire harness cover portion 10e is a region that continues from the sensor cover portion 10d, and is located on the cover member 10 inside the roof 100 (around a center thereof). The wire harness cover portion 10e is provided as a rear part of the cover member 10 as viewed from the sensor cover portion 10d.

The wire harness cover portion 10e is formed such that the height thereof approaches the height of the roof 100 in a direction away from the sensor opening portion 10a (in the backward direction with respect to the vehicle). That is, with a view to avoiding the occurrence of a swirl constituting a cause of wind noise during the running of the vehicle, the cover member 10 is formed such that the height thereof approaches the height of the roof 100 in a direction away from the sensor opening portion 10a. The wire harness cover portion 10e assumes the shape of, for example, a streamline that decreases in height in the backward direction with respect to the vehicle.

A rear end edge 10h of the wire harness cover portion 10e is a rearmost region of the cover member 10 (see FIG. 2). A lower surface of the rear end edge 10h is not in contact with the roof 100, and an air discharge gap tb is formed between the rear end edge 10h and the roof 100.

The size of the air discharge gap tb is not limited in particular, but can be set as, for example, 20 mm. The air discharge gap tb may be 15 mm or 30 mm. The air discharge gap tb can be set larger than the air introduction gap to on a front end side of the cover member 10. When the vehicle runs, air is discharged from the air discharge gap tb into the cover member 10. When it rains, the rainwater that has entered the cover member 10 from the sensor opening portion 10a or the like can be discharged.

Figure 3:
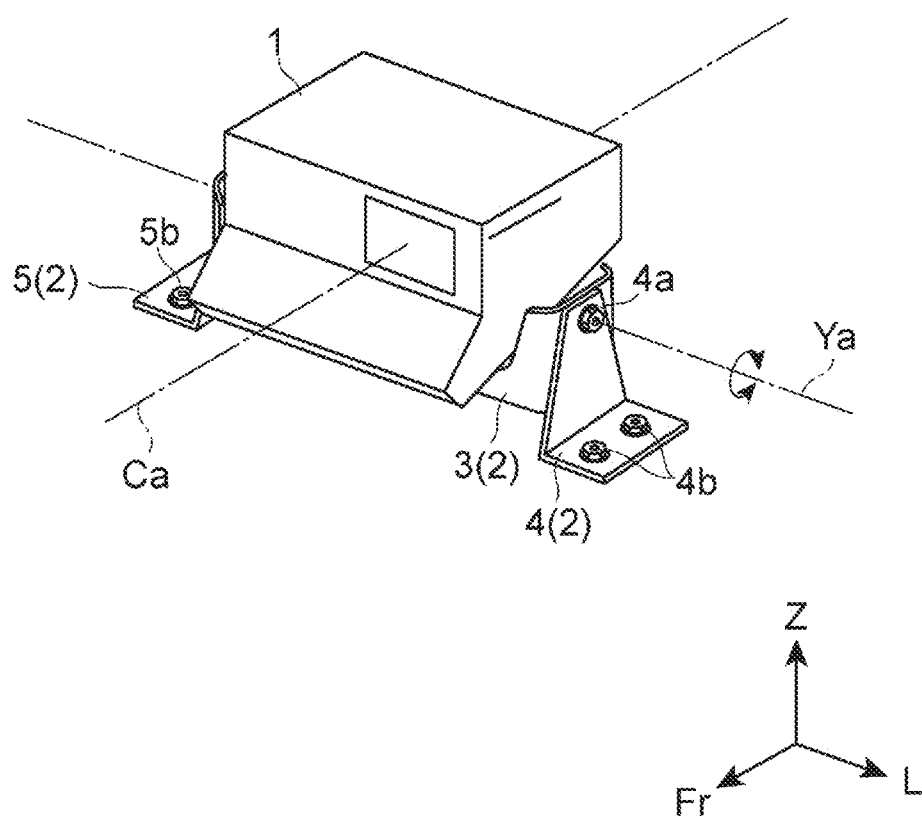
FIG. 3 is a perspective view showing an exemplary camera and an exemplary bracket.
Figure 4:
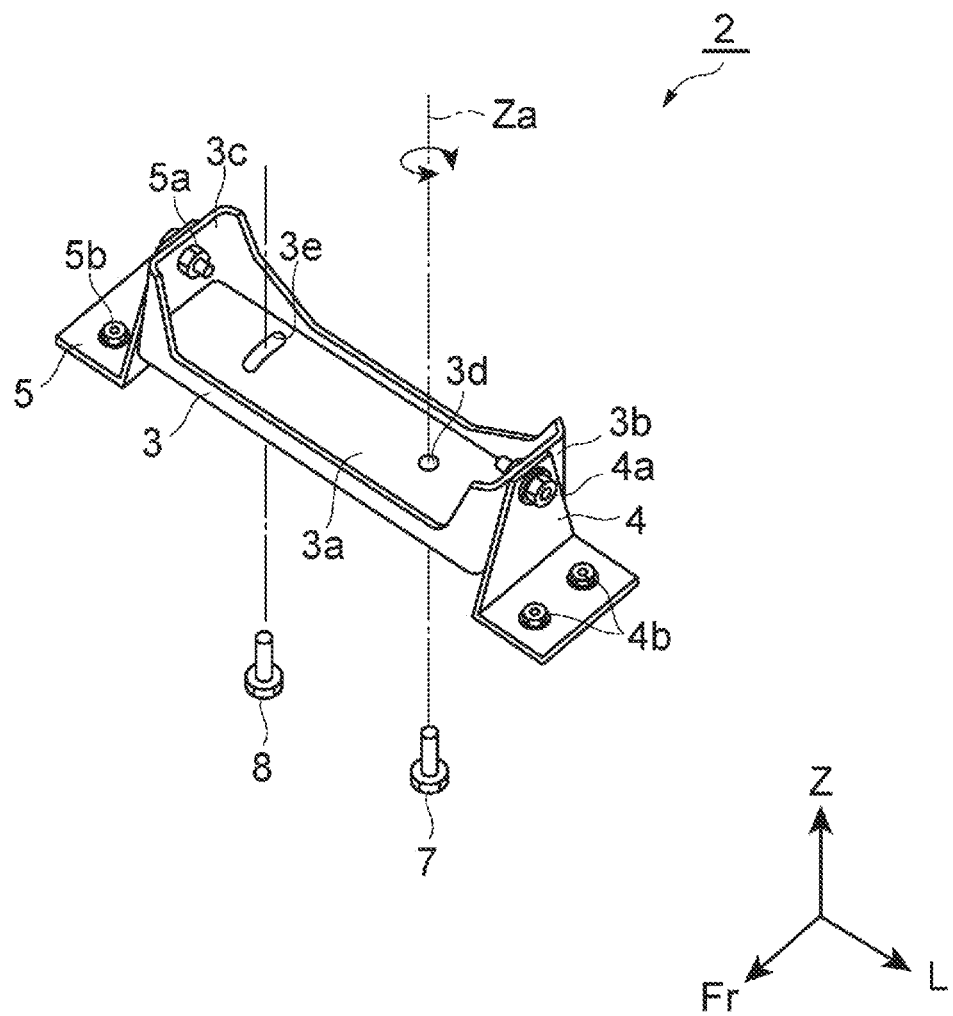
FIG. 4 is another perspective view showing the exemplary bracket.
Figure 5:
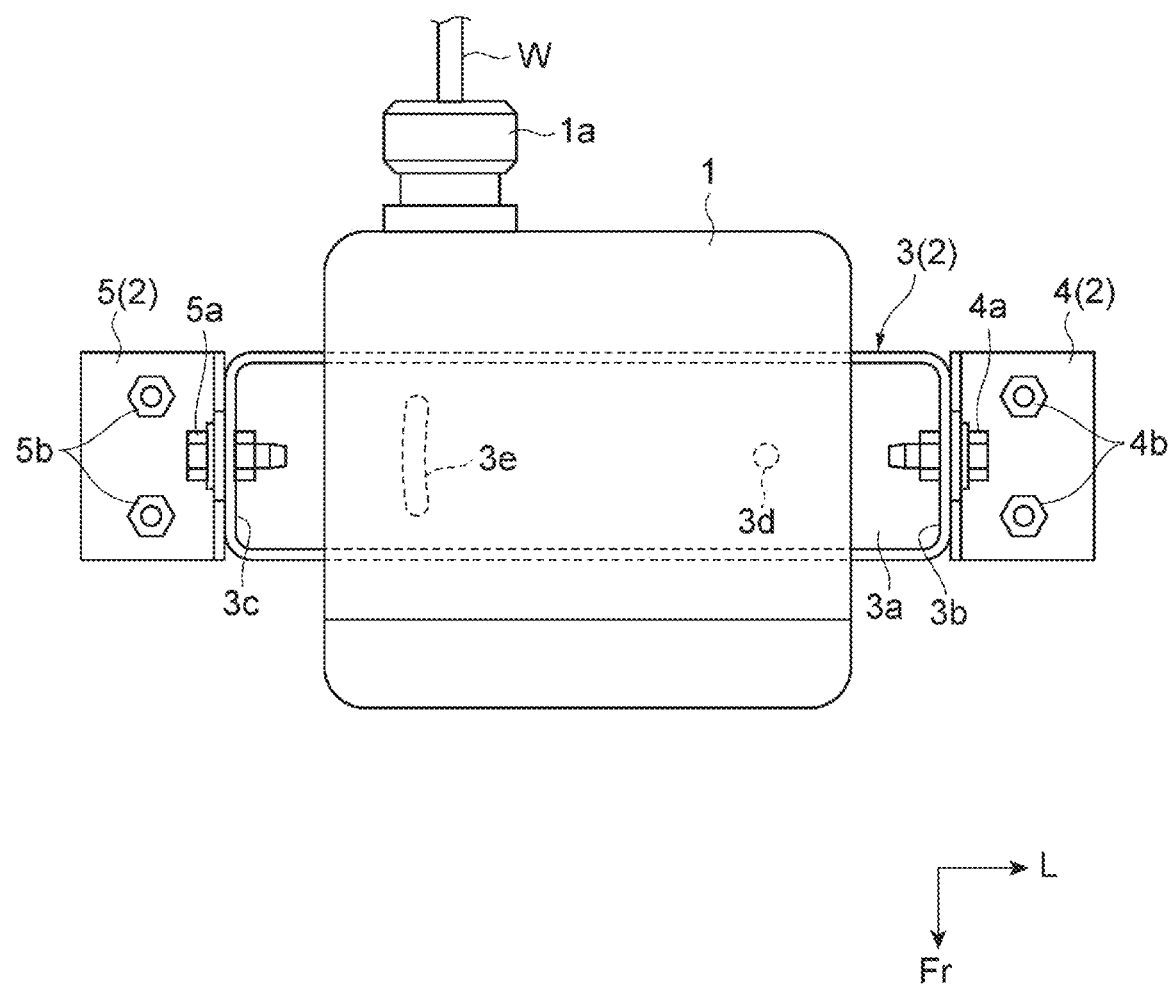
FIG. 5 is a plan view showing the exemplary camera and the exemplary bracket.

Next, the structure for supporting the sensor will be described with reference to FIGS. 3 to 5. FIG. 3 is a perspective view showing an exemplary camera and an exemplary bracket. FIG. 4 is another perspective view showing the exemplary bracket. FIG. 5 is a plan view showing the exemplary camera and the exemplary bracket.

As shown in FIGS. 3 to 5, the bracket 2 can adjust the orientation of an optical axis Ca of the camera 1, and hence supports the camera 1 in a swingable manner in a pitching direction of the vehicle and a yawing direction of the vehicle. A swing axis Ya shown in FIG. 3 is a swing axis corresponding to the swinging of the camera 1 in the pitching direction. A swing axis Za shown in FIG. 4 is a swing axis corresponding to the swinging of the camera 1 in the yawing direction.

The bracket 2 has a bracket body 3, a right leg portion 5, and a left leg portion 4. The bracket body 3 is a ship-shaped member that supports the camera 1 in an embracing manner. The right leg portion 5 and the left leg portion 4 are arranged on the right and left sides of the bracket body 3 respectively, and support the bracket body 3 in a swingable manner in the pitching direction of the vehicle (around the swing axis Ya).

The right leg portion 5 and the left leg portion 4 are L-shaped plate members that support the bracket body 3 in a swingable manner from the right and left sides respectively, on a plan view. One side of the L-shaped left leg portion 4 is connected to the bracket body 3 via a swing bolt 4a, and the other side of the L-shaped left leg portion 4 is fixed to the roof 100 by two roof bolts 4b. By the same token, one side of the L-shaped right leg portion 5 is connected to the bracket body 3 via a swing bolt 5a, and the other side of the L-shaped right leg portion 5 is fixed to the roof 100 by two roof bolts 5b.

The swing bolt 4a and the swing bolt 5a are provided opposite each other across the bracket body 3, and support the bracket body 3 in a swingable manner in the pitching direction of the vehicle. The direction in which the swing bolt 4a and the swing bolt 5a are located opposite each other corresponds to the direction in which the swing axis Ya extends. The swing bolt 4a and the swing bolt 5a are not required to have a special configuration, and common bolts can be adopted as the swing bolt 4a and the swing bolt 5a.

The bracket 2 adjusts the fastening forces of the swing bolt 4a and the swing bolt 5a, so the bracket body 3 can swing around the swing axis Ya. That is, the expression "support in a swingable manner" in the present embodiment also includes a state where the camera 1 (the sensor) can be changed over between a swingable state and a locked state (a state where the posture of the sensor can be maintained when the vehicle runs) through the adjustment of the fastening forces of the swing bolt 4a and the swing bolt 5a, or the like. The expression "support in a swingable manner" may include a state where the camera 1 can be changed over between the swingable state and the locked state through a well-known lock mechanism. The expression "support in a swingable manner" includes even the locked state of the camera 1, as long as the camera 1 can be changed over to the swingable state. The same will hold true in the following description as well.

Incidentally, the expression "swingable in the pitching direction of the vehicle" is not limited to the case where the pitching direction of the vehicle and the swinging direction of the sensor coincide with each other. For example, the sensor may be regarded as swingable in the pitching direction of the vehicle even in the case where the angle (narrow angle) formed by a rotary central axis of pitching of the vehicle (a virtual rotary central axis extending in the vehicle width direction) and a swing axis of the sensor is smaller than 45° on a plan view.

As shown in FIG. 4, the bracket body 3 has a bottom surface 3a, a right wall portion 3c, and a left wall portion 3b. The right wall portion 3c is a wall portion connected to the right leg portion 5 by the swing bolt 5a. The left wall portion 3b is a wall portion connected to the left leg portion 4 by the swing bolt 4a. The right wall portion 3c and the left wall portion 3b are located opposite each other across the bottom surface 3a.

A camera reference hole 3d and an adjustment long hole 3e are formed through the bottom surface 3a. The camera reference hole 3d is a circular hole, and a camera bolt 7 that is connected to the camera 1 is inserted into the camera reference hole 3d from below. The direction in which the camera bolt 7 is inserted through the camera reference hole 3d corresponds to the swing axis Za. The adjustment long hole 3e is an arc-like long hole formed along a circle around the camera reference hole 3d. A camera bolt 8 that is connected to the camera 1 is also inserted into the adjustment long hole 3e from below.

The camera bolts 7 and 8 are screwed into bolt grooves of the camera 1 respectively, for example, after being inserted through the bottom surface 3a of the bracket body 3 from below, and the camera 1 is thereby attached to the bracket 2. A member having the bolt grooves may be fixed to a lower surface of the camera 1. The camera bolt 8 can be adjusted in position along the arc-shaped adjustment long hole 3e in the yawing direction of the vehicle. Owing to this configuration, the camera 1 is supported in a swingable manner in the yawing direction of the vehicle, around the camera bolt 7 passing through the camera reference hole 3d.

With the vehicular sensor mounting structure according to the first embodiment described above, the camera 1 (the sensor) is supported in a swingable manner by the bracket 2, so the orientation of the camera 1 on the roof 100 can be adjusted. Furthermore, this vehicular sensor mounting structure has the wire harness cover portion 10e that passes through the roof 100 from below, that protrudes into the cover member 10, and that covers the wire harness W connected to the camera 1. Therefore, the wire harness W can be kept from being exposed to the outside of the vehicle. Thus, with this vehicular sensor mounting structure, the accuracy of the camera can be further restrained from falling as a result of a damage of the wire harness W or the like, than in the case where the wire harness W is greatly exposed. Besides, the vehicular sensor mounting structure is favorable from the standpoint of design of the vehicle as well.

Besides, with this vehicular sensor mounting structure, the camera 1 is supported in a swingable manner in the pitching direction of the vehicle and the yawing direction of the vehicle. Therefore, the degree of freedom in adjusting the orientation of the camera 1 can be made higher than in the case where the camera 1 can swing only in one direction.

Furthermore, with this vehicular sensor mounting structure, the cover member 10 is formed such that the height thereof approaches the height of the roof 100 in the backward direction with respect to the vehicle. In concrete terms, the cover member 10 is formed such that the height thereof approaches the height of the roof 100 as the distance between the wire harness cover portion 10e located on the cover member 10 inside the roof 100 (on the rear side of the vehicle) and the sensor opening portion 10a on the outer periphery side of the roof 100 increases. Therefore, the occurrence of a swirl constituting a cause of wind noise during the running of the vehicle can be further suppressed than in the case where the wire harness cover portion 10e forms a steep step.

Second Embodiment

Figure 6:
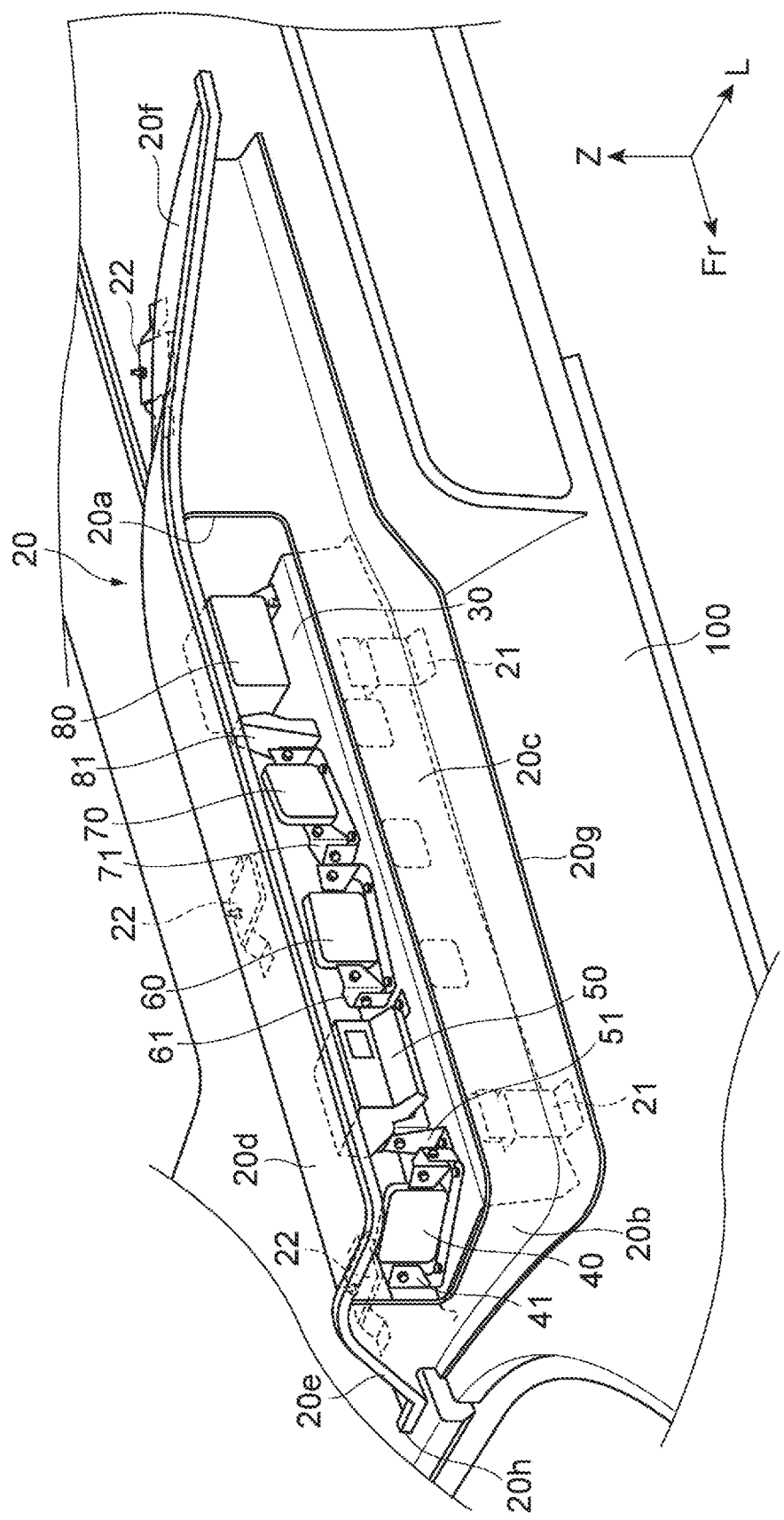
FIG. 6 is a perspective view showing a vehicular sensor mounting structure according to the second embodiment.
Figure 7:
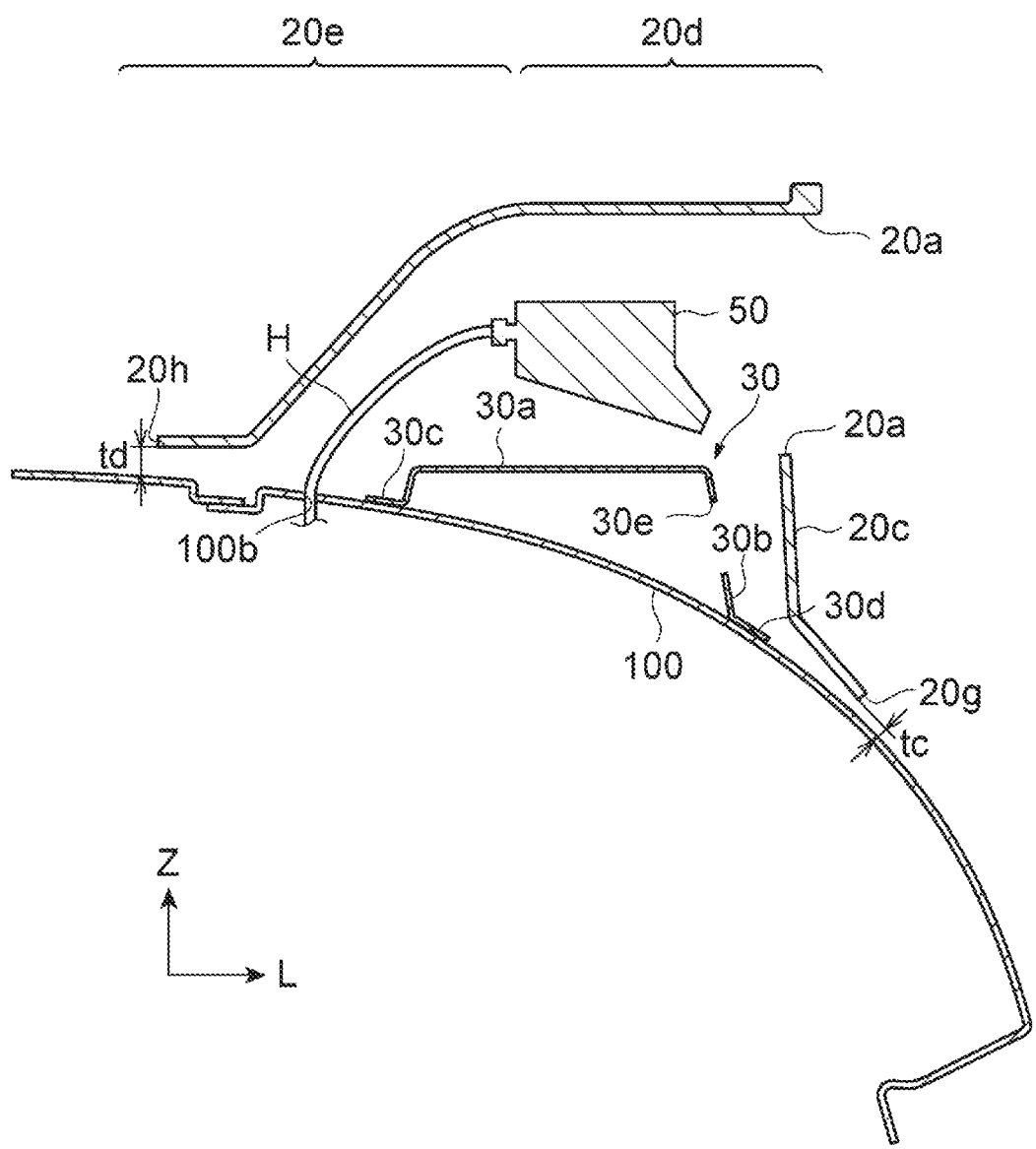
FIG. 7 is an end view of the periphery of a camera of the vehicular sensor mounting structure according to the second embodiment.

Next, a vehicular sensor mounting structure according to the second embodiment will be described with reference to the drawings. FIG. 6 is a perspective view showing the vehicular sensor mounting structure according to the second embodiment. FIG. 7 is an end view of an area around a camera of the vehicular sensor mounting structure according to the second embodiment.

As shown in FIGS. 6 and 7, the vehicular sensor mounting structure according to the second embodiment is provided on the roof 100 of the vehicle on a front-left side of the vehicle. Incidentally, the vehicular sensor mounting structure according to the second embodiment may be provided on a front-right side of the vehicle, a rear-left side of the vehicle, or a rear-right side of the vehicle. The vehicular sensor mounting structure may be provided on a center right side of the vehicle or a center left side of the vehicle.

The vehicular sensor mounting structure according to the second embodiment has a cover member 20, a sensor platform 30, a first millimeter-wave radar 40, a camera 50, a second millimeter-wave radar 60, a third millimeter-wave radar 70, and a lidar (light detection and ranging) 80.

First of all, a sensor that detects an environment outside the vehicle will be described. The first millimeter-wave radar 40 is a sensor that detects objects (other vehicles, pedestrians, and the like) outside the vehicle by transmitting millimeter waves to the area around the vehicle and receiving the millimeter waves reflected by the objects around the vehicle. The first millimeter-wave radar 40 detects an outside environment diagonally in front of and on the left side of the vehicle. The second millimeter-wave radar 60 and the third millimeter-wave radar 70 are also configured in the same manner as the first millimeter-wave radar 40. The second millimeter-wave radar 60 and the third millimeter-wave radar 70 detect an outside environment on the left side of the vehicle.

The camera 50 cam be the same as the camera 1 of the first embodiment, so the description thereof will be omitted. A lidar 80 is a sensor that detects objects outside the vehicle by transmitting light to the periphery of the vehicle instead of transmitting millimeter waves thereto, and receiving the light reflected by the objects around the vehicle. The lidar 80 detects an outside environment on the left side of the vehicle.

The number and type of sensors for detecting the environment outside the vehicle should not be limited in particular. A microwave radar, an infrared sensor, or a sonar sensor may be used as each of the sensors. Only one sensor may be provided, or five or more sensors may be provided.

The cover member 20 is a member provided on the roof 100 in such a manner as to cover, from above, the respective sensors 40, 50, 60, 70, and 80 (hereinafter referred to as the respective sensors 40 to 80). The cover member 20 is fixed to the roof 100 by attachment tools 21 and 22. The cover member 20 has a sensor opening portion 20a, a front wall portion 20b, a lateral wall portion 20c, a sensor cover portion 20d, a wire harness cover portion 20e, and a rear extension portion 20f.

The sensor opening portion 20a opens toward the left side of the vehicle and the front side (the outer periphery side) of the vehicle, and is formed such that part of the sensor opening portion 20a extends as far as the front side from the left side. Detection of the outside environment is carried out by the respective sensors 40 to 80 through the sensor opening portion 20a.

The sensor opening portion 20a is an opening common to the respective sensors 40 to 80, and is formed as a horizontally long opening that has a certain margin in the height direction such that the respective sensors 40 to 80 are capable of detection even when the orientations thereof are adjusted to some extent. Incidentally, instead of forming the sensor opening portion 20a that is common to the respective sensors 40 to 80, individual opening portions may be formed for the sensors respectively.

The front wall portion 20b is a wall portion of the cover member 20 on the front side. The front wall portion 20b forms part of a lower edge (part extending as far as the area in front of the vehicle) of the sensor opening portion 20a and a right end edge of the sensor opening portion 20a. An air introduction gap is formed between a lower surface of the front wall portion 20b and the roof 100. The size of the air introduction gap is not limited in particular, but the air introduction gap can be made equal to the gap ta of the first embodiment.

The lateral wall portion 20c is a left wall portion of the cover member 20 (a wall portion in the direction in which the respective sensors 50 to 80 are oriented). The lateral wall portion 20c forms a large part of the lower edge of the sensor opening portion 20a and a left-end edge of the sensor opening portion 20a. A lower end of the lateral wall portion 20c protrudes leftward to form a left-end edge 20g.

The left-end edge 20g is a leftmost region of the cover member 20 (see FIGS. 6 and 7). A lower surface of the left-end edge 20g is not in contact with the roof 100, and an air passage gap tc is formed between the left-end edge 20g and the roof 100. The size of the air passage gap tc is not limited in particular, but the air passage gap tc can be made equal to, for example, the gap ta of the first embodiment. The size of the air passage gap tc may be, for example, 5 mm, 7 mm, or 10 or more mm.

The sensor cover portion 20d is a region forming the ceiling part of the cover member 20. The sensor cover portion 20d is provided in such a manner as to cover the camera 1 above the respective sensors 40 to 80, and forms an upper edge of the sensor opening portion 20a. The sensor cover portion 20d is provided in such a manner as to form a space that is high enough to accommodate the respective sensors 40 to 80.

The wire harness cover portion 20e is a region that forms a ceiling part of the cover member 20 together with the sensor cover portion 20d. The wire harness cover portion 20e is located on the cover member 20 inside the roof 100 (close to the center of the roof 100). The wire harness cover portion 20e is provided on the right side of the cover member 20 as viewed from the sensor cover portion 20d.

The wire harness cover portion 20e is provided in such a manner as to cover, from above, a wire harness connected to the respective sensors 40 to 80 (e.g., a wire harness H connected to the camera 50). Besides, the wire harness cover portion 20e forms a space that accommodates the wire harness H together with the front wall portion 20b. For example, the wire harness H passes through the wire passage hole 100b of the roof 100 from below, protrudes into the cover member 10, and is connected to the camera 50 without being exposed to the outside of the cover member 20.

The rear extension portion 20f is a region that forms the ceiling part of the cover member 20 together with the sensor cover portion 20d and the wire harness cover portion 20e. The rear extension portion 20f is located on the rear part of the cover member 20 with respect to the vehicle (in the backward direction with respect to the roof 100). The rear extension portion 20f is formed such that the height thereof approaches the height of the roof 100 in the backward direction with respect to the vehicle. Thus, the cover member 20 also assumes such a shape that the height thereof approaches the height of the roof 100 in the backward direction with respect to the vehicle.

Next, the sensor platform 30 will be described. The sensor platform 30 is a platform that supports the respective sensors 40 to 80. The sensor platform 30 may be construed as a bracket in the broad sense of the term. The sensor platform 30 is formed of, for example, a single metal plate (e.g., an aluminum plate), and is fixed to the roof 100 through gluing or the like. The sensor platform 30 may be made of resin. The respective sensors 40 to 80 are mounted on the roof 100 via the sensor platform 30.

Figure 8:
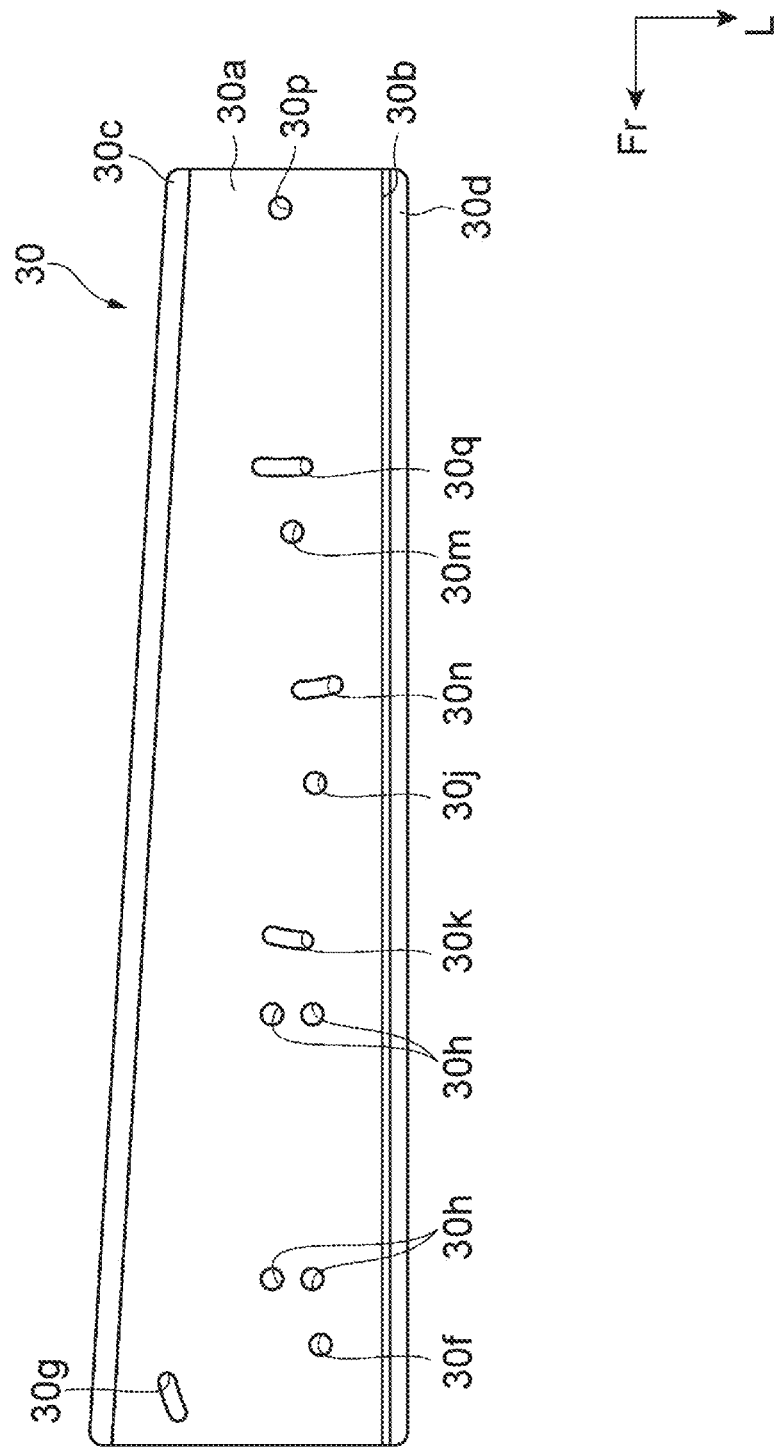
FIG. 8 is a plan view showing an exemplary sensor platform.

It should be noted herein that FIG. 8 is a plan view showing an example of the sensor platform 30. As shown in FIGS. 6 to 8, the sensor platform 30 has a sensor attachment portion 30a, a lateral surface portion 30b, a right leg portion 30c, a left leg portion 30d, and opening portions 30e.

The sensor attachment portion 30a is a region that forms an upper surface of the sensor platform 30, and to which the respective sensors 50, 60, 70, and 80 are attached. Bolt holes 30g to 30q for attaching the sensors 40, 50, 60, 70, and 80 to the sensor attachment portion 30a respectively are formed through the sensor attachment portion 30a (see FIG. 8).

Among the bolt holes 30g to 30q, the sensor reference hole 30f and the adjustment long hole 30g are bolt holes for attaching the first millimeter-wave radar 40 (a bracket 41 of the first millimeter-wave radar 40) to the sensor attachment portion 30a. The sensor reference hole 30f is a circular hole, and is formed in such a manner as to pair with the adjustment long hole 30g. The adjustment long hole 30g is an arc-like long hole formed along a circle around the sensor reference hole 30f.

The sensor reference hole 30f and the adjustment long hole 30g are equivalent to the camera reference hole 3d and the adjustment long hole 3e in the first embodiment, respectively. That is, the first millimeter-wave radar 40 is supported in a swingable manner in the yawing direction of the vehicle around the sensor reference hole 30f, by being configured to be fastened to the sensor reference hole 30f and the adjustment long hole 30g by bolts respectively.

Incidentally, the sensor reference hole 30j and the adjustment long hole 30k (corresponding to the second millimeter-wave radar 60), the sensor reference hole 30m and the adjustment long hole 30n (corresponding to the third millimeter-wave radar 70), and the sensor reference hole 30p and the adjustment long hole 30q (corresponding to the lidar 80) are configured in the same manner as the sensor reference hole 30f and the adjustment long hole 30g respectively, so the description thereof will be omitted.

The four bolt holes 30h are bolt holes for fixing a bracket 51 of the camera 50 to the sensor platform 30. The four bolt holes 30h are all circular holes. That is, the bracket 51 is fixed to the sensor platform 30, and cannot swing. The bracket 51 of the camera 50 is structured in the same manner as the bracket 2 of the first embodiment. Owing to the structure of the bracket 51, the camera 50 can swing in the yawing direction of the vehicle.

The lateral surface portion 30b is a region that forms a left lateral surface of the sensor platform 30. The lateral surface portion 30b is located opposite the lateral wall portion 20c of the cover member 20. The right leg portion 30c is a region that extends rightward from the sensor attachment portion 30a and that is fixed to the roof 100. The left leg portion 30d is a region that extends leftward from a lower end of the lateral surface portion 30b and that is fixed to the roof 100. The sensor platform 30 is fixed to the roof 100 by the right leg portion 30c and the left leg portion 30d from the right and left sides respectively. Incidentally, the three opening portions 30e are formed through the lateral surface portion 30b. It is not indispensable to form the opening portions 30e.

Figure 9:
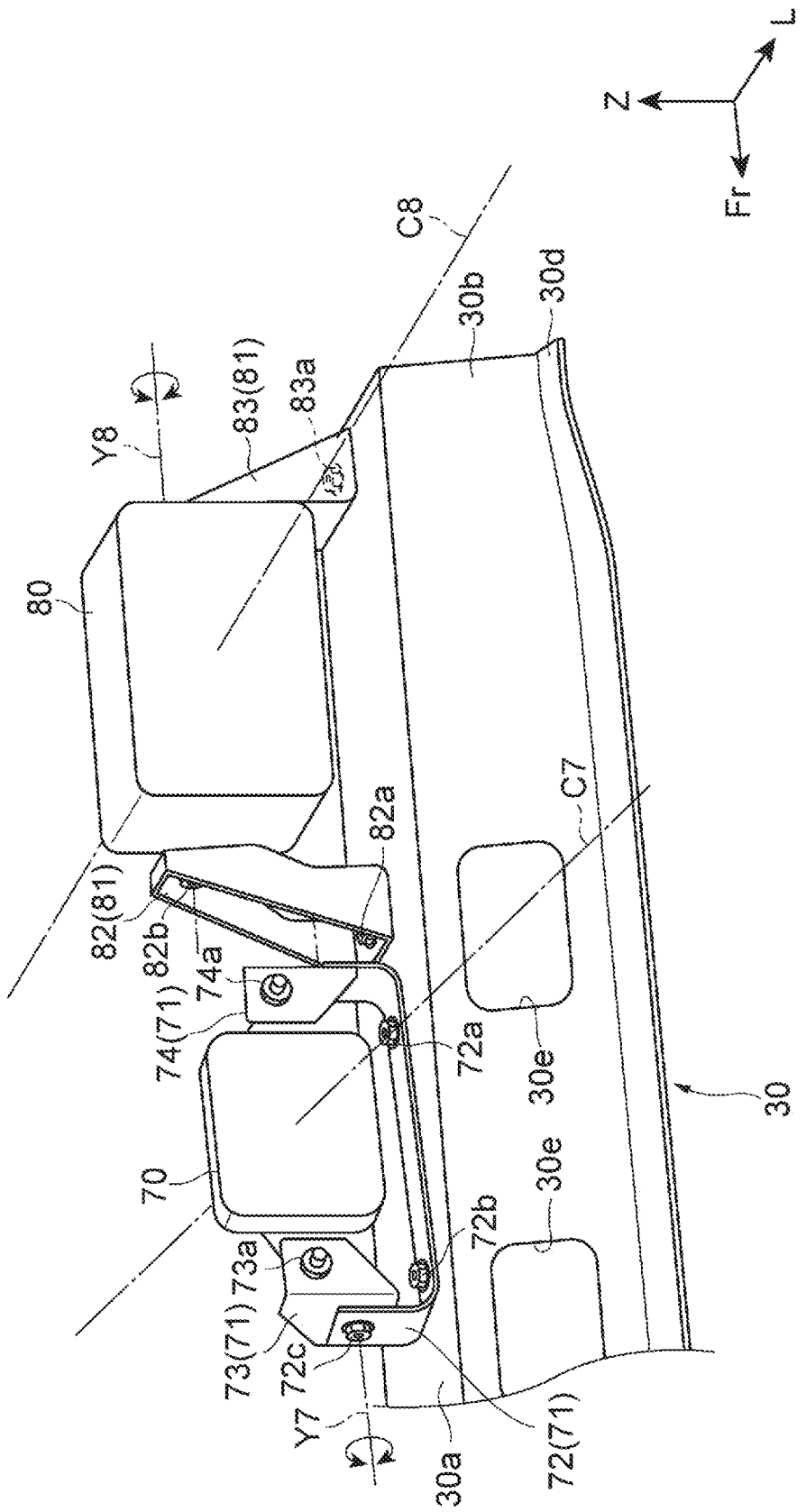
FIG. 9 is a perspective view for illustrating a structure for supporting a millimeter-wave radar and a lidar.

Subsequently, an exemplary structure for supporting the sensor will be described. FIG. 9 is a perspective view for illustrating an exemplary structure for supporting a millimeter-wave radar and a lidar. In FIG. 9, a detection axis C7 of the third millimeter-wave radar 70, and a detection axis C8 of the lidar 80 are depicted.

First of all, the structure for supporting the third millimeter-wave radar 70 will be described. As the supporting structure, the first millimeter-wave radar 40 (the bracket 41) and the second millimeter-wave radar 60 (a bracket 61) can also be configured in the same manner. As shown in FIG. 9, a bracket 71 of the third millimeter-wave radar 70 has a platform connection portion 72 attached to the sensor platform 30, a right sensor support portion 73, and a left sensor support portion 74. In this specification, the right and left will be described with reference to the orientation of the third millimeter-wave radar 70.

The platform connection portion 72 is a U-shaped plate member opened upward in a lateral view, and is attached to the sensor platform 30 by a platform bolt 72a and a platform bolt 72b. The platform bolt 72a is inserted through the circular sensor reference hole 30f shown in FIG. 8, and the platform bolt 72b is inserted through the arc-like adjustment long hole 30g. The platform bolt 72b can be adjusted in position along the arc-like adjustment long hole 30g in the yawing direction of the vehicle. Owing to this configuration, the bracket 71 of the third millimeter-wave radar 70 is attached to the sensor platform 30 (the roof 100) in a swingable manner in the yawing direction of the vehicle. The third millimeter-wave radar 70 is supported in a swingable manner in the yawing direction of the vehicle, by the bracket 71.

The platform connection portion 72 supports the third millimeter-wave radar 70 via the right sensor support portion 73 and the left sensor support portion 74. The right sensor support portion 73 is an L-shaped plate member connected to the right side of the third millimeter-wave radar 70 by a sensor bolt 73a. The left sensor support portion 74 is an L-shaped plate member connected to the left side of the third millimeter-wave radar 70 by a sensor bolt 74a.

The platform connection portion 72 supports the third millimeter-wave radar 70 in a swingable manner in the rolling direction of the vehicle (around a swing axis Y7) by connecting the right sensor support portion 73 and the left sensor support portion 74 in a swingable manner by a pair of swing bolts 72c that are located opposite each other in such a manner as to laterally sandwich the third millimeter-wave radar 70, respectively. The swing axis Y7 corresponds to a direction in which the swing bolts 72c are located opposite each other (a direction in which the swing bolts 72c are inserted).

Incidentally, the expression "swingable in the rolling direction of the vehicle" is not limited to a case where the rolling direction of the vehicle and the swinging direction coincide with each other. For example, the sensor may be regarded as swingable in the rolling direction of the vehicle even in the case where the angle (narrow angle) formed by a rotary central axis of rolling of the vehicle (equivalent to a virtual longitudinal axis of the vehicle) and the swing axis of the sensor is smaller than 45° on a plan view.

Next, the structure for supporting the lidar 80 will be described. A bracket 81 of the lidar 80 has a right bracket 83 and a left bracket 82. The right bracket 83 and the left bracket 82 support the lidar 80 in a laterally sandwiching manner. In this specification, the right and left will be described with reference to the orientation of the lidar 80.

The left bracket 82 is attached to the sensor platform 30 by a platform bolt 82a, and supports the lidar 80 in a swingable manner by a swing bolt 82b. The platform bolt 82a is inserted through the adjustment long hole 30q of the sensor platform 30, and can be adjusted in position along the arc-like adjustment long hole 30q in the yawing direction of the vehicle. The right bracket 83 is attached to the sensor platform 30 by a platform bolt 83a, and supports the lidar 80 in a swingable manner by a swing bolt (not shown). Owing to this configuration, the lidar 80 is supported in a swingable manner in the yawing direction of the vehicle and the rolling direction of the vehicle. Incidentally, the structure for supporting the sensor shown in FIG. 9 is an example, and a well-known support structure can be adopted.

With the vehicular sensor mounting structure according to the second embodiment described above, the respective sensors 40 to 80 are supported in a swingable manner as is the case with the first embodiment. Therefore, the orientations of the respective sensors 40 to 80 on the roof 100 can be adjusted. Besides, the respective sensors 40 to 80 are supported in a swingable manner in the rolling direction of the vehicle and the yawing direction of the vehicle. Therefore, the degree of freedom in adjusting the orientations of the respective sensors 40 to 80 can be made higher than in the case where the respective sensors 40 to 80 can swing only in one direction. Furthermore, with this vehicular sensor mounting structure, the wire harness cover portion 20e can keep the wire harness H or the like from being exposed to the outside of the vehicle, and the accuracy of the sensor can be restrained from falling as a result of a damage of the wire harness H or the like.

Besides, with this vehicular sensor mounting structure, the wire harness cover portion 20e is formed such that the height thereof approaches the height of the roof 100 in the direction away from the sensor opening portion 20a on the outer periphery side of the roof 100. Therefore, the occurrence of a swirl constituting a cause of wind noise during the running of the vehicle can be further suppressed than in the case where the wire harness cover portion 20e located inside the roof 100 forms a steep step. Furthermore, with this vehicular sensor mounting structure, the cover member 10 has the rear extension portion 20f, and is formed such that the height thereof approaches the height of the roof 100 in the backward direction with respect to the vehicle. Therefore, the occurrence of a swirl constituting a cause of wind noise during the running of the vehicle can be further suppressed than in the case where the area behind the cover member 10 forms a steep step.

While the embodiments of the disclosure have been described above, the disclosure should not be limited to the above-mentioned embodiments. The disclosure can be carried out in a variety of modes subjected to various alterations and improvements based on the knowledge of those skilled in the art, not to mention the above-mentioned embodiments.

For example, in the first embodiment as well, an interposition member such as a platform may be interposed between the roof 100 and the bracket 2. Besides, the sensor is not absolutely required to be supported in a swingable manner in two directions. The sensor may be supported in a swingable manner in only one of the pitching direction, the rolling direction, and the yawing direction of the vehicle.

The wire harness cover portion 10e or 20e is not absolutely required to be formed such that the height thereof approaches the height of the roof 100 in the direction away from the sensor opening portion 10a or 20a. The wire harness cover portion 10e or 20e may be constant in height, or may have at least one location that increases in height in the direction away from the sensor opening portion 10a or 20a.

The cover member 20 of the second embodiment is not absolutely required to be formed such that the height thereof approaches the height of the roof 100 in the backward direction with respect to the vehicle. The cover member 20 may be constant in height, or may have at least one location that increases in height in the backward direction with respect to the vehicle. The cover member 20 may have a substantially vertical rear wall portion instead of the rear extension portion 20f.

The gap between the cover member 10 or 20 and the roof 100 may not be absolutely required to be formed along the entire circumference. The gap may be formed only behind the vehicle, or behind and laterally of the vehicle. Besides, there may be adopted an aspect in which there is no gap (which is smaller than 1 mm or the like) between the cover member 10 or 20 and the roof 100.

What is claimed is:

1. A vehicular sensor mounting structure for a sensor that detects an environment outside a vehicle on a roof of the vehicle, the vehicular sensor mounting structure comprising:
   a bracket attached to the roof to support the sensor in a swingable manner; and
   a cover member having a sensor opening portion that opens toward an outer periphery of the roof, and provided on the roof in such a manner as to cover the sensor from above, wherein
   the cover member has a wire harness cover portion covering, from above, a wire harness that passes through the roof from below, that protrudes into the cover member, and that is connected to the sensor, and
   the bracket supports the sensor in a swingable manner in a rolling direction of the vehicle and a yawing direction of the vehicle.

2. The vehicular sensor mounting structure according to claim 1, wherein
   the bracket is configured to support the sensor in a swingable manner in a pitching direction of the vehicle.

3. The vehicular sensor mounting structure according to claim 1, wherein
   the wire harness cover portion is located on the cover member adjacent to a center of the roof, and a height of the wire harness cover portion approaches a height of the roof in a direction away from the sensor opening portion.

4. The vehicular sensor mounting structure according to claim 1, wherein
   a height of the cover member approaches a height of the roof in a backward direction with respect to the vehicle.

5. The vehicular sensor mounting structure according to claim 1, wherein
   the bracket is configured to swingably support the sensor in the rolling direction about a first axis in a front-rear direction of vehicle, and in the yawing direction about a second axis in a height direction of the vehicle.

6. The vehicular sensor mounting structure according to claim 1, wherein
   the cover member further comprises a wall portion partially defining a lower edge of the sensor opening portion,
   a first gap is arranged between the wall portion and the roof, and
   a second gap is arranged between an end edge of the wire harness cover portion and the roof.

7. The vehicular sensor mounting structure according to claim 1, wherein
   the bracket comprises a sensor platform including
      a sensor attachment portion, and
      leg portions extending from the sensor attachment portion and configured to be attached to the roof.

8. The vehicular sensor mounting structure according to claim 7, wherein
   the bracket further comprises
      a bracket body spaced away from the sensor platform and configured to directly support the sensor,
      a first leg portion having one side swingably connected to a first side of the bracket body, and another side connected to the sensor attachment portion, and
      a second leg portion having one side swingably connected to a second side of the bracket body opposite to the first side, and another side connected to the sensor attachment portion.

9. The vehicular sensor mounting structure according to claim 8, wherein
   the sensor attachment portion includes a plurality of holes receiving a plurality of bolts, and
   the first leg portion and the second leg portion are attached to the sensor attachment portion by the plurality of bolts.

10. The vehicular sensor mounting structure according to claim 8, wherein
    the bracket body includes
       a reference hole configured to receive a first bolt to connect to the sensor, and
       an adjustment hole having an arc shape and configured to receive a second bolt to connect to the sensor.

* * * * *